US006624132B1

(12) United States Patent
Man et al.

(10) Patent No.: US 6,624,132 B1

(45) Date of Patent: Sep. 23, 2003

(54) STABLE LIQUID ENZYME COMPOSITIONS WITH ENHANCED ACTIVITY

(75) Inventors: Victor Fuk-Pong Man, St. Paul, MN (US); Steven Eugene Lentsch, St. Paul, MN (US); Yvonne Marie Killeen, South St. Paul, MN (US)

(73) Assignee: Ecolab Inc., St. Paul, MN (US)

(*) Notice: Subject to any disclaimer, the term of this patent is extended or adjusted under 35 U.S.C. 154(b) by 0 days.

(21) Appl. No.: 09/606,478

(22) Filed: Jun. 29, 2000

(51) Int. Cl.$^7$ .............................. C11D 7/42; C12S 3/00

(52) U.S. Cl. ........................ 510/392; 510/321; 510/530; 510/535; 510/531; 510/532

(58) Field of Search ................................ 510/392, 530, 510/535, 531, 321, 532

(56) References Cited

U.S. PATENT DOCUMENTS

| | | | | |
|---|---|---|---|---|
| 3,790,482 A | | 2/1974 | Jones et al. | 252/525 |
| 3,929,678 A | * | 12/1975 | Laughlin et al. | 252/526 |
| 3,961,754 A | | 6/1976 | Kuhns et al. | 239/289 |
| 4,211,517 A | | 7/1980 | Schmid | 417/12 |
| 4,212,761 A | | 7/1980 | Ciaccio | 252/174.12 |
| 4,238,345 A | | 12/1980 | Guilbert | 252/174.12 |
| 4,243,543 A | | 1/1981 | Guilbert et al. | 252/105 |
| 4,261,868 A | | 4/1981 | Hora et al. | 252/529 |
| 4,462,922 A | | 7/1984 | Boskamp | 510/393 |
| 4,481,167 A | | 11/1984 | Ginter et al. | 422/29 |
| 4,537,706 A | | 8/1985 | Severson, Jr. | 252/544 |
| 4,595,520 A | | 6/1986 | Heile et al. | 252/160 |
| 4,608,189 A | | 8/1986 | Koch et al. | 252/174.22 |
| 4,670,179 A | | 6/1987 | Inamorato et al. | 510/321 |
| 4,680,134 A | | 7/1987 | Heile et al. | 252/160 |
| 4,690,305 A | | 9/1987 | Copeland | 222/52 |
| 4,826,661 A | | 5/1989 | Copeland et al. | 422/106 |
| 4,836,951 A | | 6/1989 | Totten et al. | 252/174.21 |
| 4,845,965 A | | 7/1989 | Copeland et al. | 68/17 |
| 4,858,449 A | | 8/1989 | Lehn | 68/12 |
| 4,983,315 A | | 1/1991 | Glogowski et al. | 252/102 |
| 5,064,561 A | | 11/1991 | Rouillard | 252/174.12 |

(List continued on next page.)

FOREIGN PATENT DOCUMENTS

| | | |
|---|---|---|
| EP | 0 348 183 | 12/1989 |
| EP | 0 451 924 | 10/1990 |
| EP | 0 481 542 | 4/1992 |
| EP | 0 501 375 A1 | 9/1992 |
| GB | 1 224 564 | 3/1971 |
| GB | 2 140 818 A | 12/1984 |
| GB | 2 200 132 A | 7/1988 |
| GB | 2 271 120 A | 4/1994 |
| WO | WO 93/21299 | 10/1993 |
| WO | WO 95/00621 | 1/1995 |
| WO | WO 96/06910 | 3/1996 |
| WO | WO 96/41859 | 12/1996 |
| WO | WO 97/02753 | 1/1997 |
| WO | WO 97/07190 | 2/1997 |
| WO | WO 98/54285 | 12/1998 |

OTHER PUBLICATIONS

International Search Report, European Patent Office, Oct. 26, 2001.

*Primary Examiner*—Yogendra N. Gupta
*Assistant Examiner*—Eisa Elhilo
(74) *Attorney, Agent, or Firm*—Merchant & Gould P.C.

(57) ABSTRACT

The present invention relates to a liquid enzyme cleaning composition in which the enzyme is stable at alkaline pH and in the presence of water at concentrations of at least about 50 to about 60 weight percent. In one embodiment, the composition of the invention stabilizes the enzyme with potassium borate.

46 Claims, 3 Drawing Sheets

U.S. PATENT DOCUMENTS

| | | | | | |
|---|---|---|---|---|---|
| 5,118,426 | A | | 6/1992 | Duncan et al. | 210/721 |
| 5,122,538 | A | | 6/1992 | Lokkesmoe et al. | 514/557 |
| 5,173,207 | A | | 12/1992 | Drapier et al. | 252/99 |
| 5,223,179 | A | | 6/1993 | Connor et al. | 252/548 |
| 5,234,719 | A | | 8/1993 | Richter et al. | 427/384 |
| 5,292,525 | A | | 3/1994 | Brenden et al. | 424/601 |
| 5,395,541 | A | | 3/1995 | Carpenter et al. | 252/174.12 |
| 5,407,700 | A | | 4/1995 | Man et al. | 427/154 |
| 5,451,336 | A | | 9/1995 | Schwadtke et al. | 252/89.1 |
| 5,494,817 | A | | 2/1996 | Chen | 435/188 |
| 5,578,134 | A | | 11/1996 | Lentsch et al. | 134/3 |
| 5,851,973 | A | | 12/1998 | Foley | 510/235 |
| H1776 | H | * | 1/1999 | Linard et al. | 510/530 |
| 5,858,117 | A | | 1/1999 | Oakes et al. | 134/27 |
| 5,858,299 | A | | 1/1999 | Fernholz et al. | 264/414 |
| 5,858,941 | A | | 1/1999 | Oakes et al. | 510/179 |
| 5,861,366 | A | | 1/1999 | Ihns et al. | 510/320 |
| 5,876,514 | A | | 3/1999 | Rolando et al. | 134/25.2 |
| 5,883,062 | A | | 3/1999 | Addison et al. | 510/235 |
| 6,004,922 | A | | 12/1999 | Watson et al. | 510/476 |
| 6,008,178 | A | | 12/1999 | Baillely et al. | 510/392 |
| 6,015,781 | A | | 1/2000 | Vinson et al. | 510/302 |
| 6,017,864 | A | | 1/2000 | Brittain et al. | 510/218 |
| 6,020,303 | A | | 2/2000 | Cripe et al. | 510/503 |
| 6,025,316 | A | | 2/2000 | Cao et al. | 510/360 |
| 6,046,150 | A | | 4/2000 | Choy et al. | 510/376 |
| 6,060,444 | A | | 5/2000 | Schulz et al. | 510/451 |
| 6,150,324 | A | * | 11/2000 | Lentsch et al. | 510/446 |

* cited by examiner

PROTEOLYTIC ENZYME ACTIVITY ASSAY

120°F

STABLE LIQUID ENZYME COMPOSITIONS WITH ENHANCED ACTIVITY

FIELD OF THE INVENTION

The present invention relates to a liquid enzyme cleaning composition in which the enzyme is stable at alkaline pH and in the presence of water at concentrations of at least about 60 weight percent. The present enzyme cleaning composition typically yields superior soil (especially protein soil) removal properties. In one embodiment, the composition of the invention stabilizes the enzyme with potassium borate.

BACKGROUND OF THE INVENTION

A major challenge of detergent development for industry, restaurants, and homes is the successful removal of soils that are resistant to conventional treatment and the elimination of chemicals that are not compatible with the surroundings. One such soil is protein, and one such chemical is chlorine or chlorine yielding compounds, which can be incorporated into detergent compounds or added separately to cleaning programs for protein removal. Protein soil residues, often called protein films, occur in all food processing industries, in restaurants, in laundries, and in home cleaning situations.

In the past, chlorine has been employed to degrade protein by oxidative cleavage and hydrolysis of the peptide bond, which breaks apart large protein molecules into smaller peptide chains. The conformational structure of the protein disintegrates, dramatically lowering the binding energies, and effecting desorption from the surface, followed by solubilization or suspension into the cleaning solution. The use of chlorinated detergent is not without problems, such as harshness and corrosion. In addition, a new issue may force change upon both the industry, consumers, and detergent manufacturers: the growing public concern over the health and environmental impacts of chlorine and organochlorines.

Detersive enzymes represent an alternative to chlorine and organochlorines. Enzymes have been employed in cleaning compositions since early in the $20^{th}$ century. However, it took years of research, until the mid 1960's, before enzymes like bacterial alkaline proteases were commercially available and which had all of the minimum pH stability and soil reactivity for detergent applications. Patents issued through the 1960s related to use of enzymes for consumer laundry pre-soak or wash cycle detergent compositions and consumer automatic dishwashing detergents. Early enzyme cleaning products evolved from simple powders containing alkaline protease to more complex granular compositions containing multiple enzymes to liquid compositions containing enzymes. See, for example, U.S. Pat. No. 3,451,935 to Roald et al., issued Jun. 24, 1969 and U.S. Pat. No. 3,519,570 to McCarty issued Jul. 7, 1970.

Liquid detergent compositions containing enzymes have advantages compared to dry powder forms. Enzyme powders or granulates tended to segregate in these mechanical mixtures resulting in non-uniform, and hence undependable, product in use. In dry compositions, humidity can cause enzyme degradation. Dry powdered compositions are not as conveniently suited as liquids for rapid solubility or miscibility in cold and tepid waters nor functional as direct application products to soiled surfaces. For these reasons and for expanded applications, it became desirable to have liquid enzyme compositions.

Although water is a desirable solvent for liquid cleaning compositions, there are problems in formulating enzymes into aqueous compositions. Enzymes generally denature or degrade in an aqueous medium resulting in the serious reduction or complete loss of enzyme activity. This instability results from at least two mechanisms. Enzymes have three-dimensional protein structure which can be physically or chemically changed by other solution ingredients, such as surfactants and builders, causing loss of catalytic effect. Alternately when protease is present in the composition, the protease will cause proteolytic digestion of the other enzymes if they are not proteases; or of itself via a process called autolysis. The prior art discloses attempts to deal with these aqueous induced enzyme stability problems by minimizing water content or altogether eliminating water from the liquid enzyme containing composition. See, for example, U.S. Pat. No. 3,697,451 to Mausner et al. issued Oct. 10, 1972 and U.S. Pat. No. 4,753,748 to Lailem et al. issued Jun. 28, 1988.

In order to market an aqueous enzyme composition, the enzyme must be stabilized so that it will retain its functional activity for prolonged periods of (shelf-life or storage) time. If a stabilized enzyme system is not employed, an excess of enzyme is generally required to compensate for expected loss. However, enzymes are expensive and are in fact the most costly ingredients in a commercial detergent even though they are present in relatively minor amounts. Thus, it is no surprise that various methods of stabilizing enzyme-containing, aqueous, liquid detergent compositions are described in the patent literature. There remains a need, however, for additional methods and compositions for stabilizing enzymes in cleaning compositions, particularly at high concentrations of water and alkaline pH.

SUMMARY OF THE INVENTION

The present invention relates to a liquid enzyme cleaning composition in which the enzyme is stable at alkaline pH and in the presence of water at concentrations of at least about 60 weight percent. The enzyme cleaning composition preferably employs potassium borate to stabilize one or more enzymes at these conditions of pH and water concentration. The present composition maintains stability of the enzyme at alkaline pH, which preferably falls in the range of about 8 to about 11, preferably greater than about 9, preferably about 9 to about 10, preferably about 9.3. The present composition maintains stability of the enzyme at concentrations of water up to about 85%, preferably in the range of about 60% by weight to about 85% by weight water, preferably about 60% by weight to about 70% by weight water, preferably 62% by weight to 69–72% by weight water.

In an embodiment, the liquid enzyme cleaning composition includes a surfactant, a detersive enzyme, a boric acid salt, and at least about 60% by weight water, formulated to retain about 100% of the detersive enzyme's initial activity at ambient temperature for at least about 11 months after forming the composition. In an embodiment, the liquid enzyme cleaning composition includes a surfactant, a detersive enzyme, a potassium borate, and at least about 60% by weight water. In an embodiment, the liquid enzyme cleaning composition includes a surfactant, a detersive enzyme, a boric acid salt, and at least about 80% by weight water.

Potassium borate is a preferred boric acid salt in each of these embodiments. Potassium borate is preferably present in an amount effective to provide significant stabilization of the enzyme compared to compositions without potassium borate at the same concentrations of water. Potassium borate can be present at about 10 or 15 weight percent. Preferably, after forming the present liquid enzyme cleaning composition including potassium borate, the detersive enzyme retains about 100% of its initial activity for at least about 11 months at ambient temperature. Preferably, after forming the present liquid enzyme cleaning composition including potassium borate, the detersive enzyme retains at least about 80% of its initial activity at 100° F. for at least about 50 days after forming the composition. Preferably, after forming the present liquid enzyme cleaning composition including potassium borate, the detersive enzyme retains at least about 50% of its initial activity at 120 OF for at least about 25 days after forming the composition.

The present composition can stabilize one or more of a variety of enzyme. Detersive enzymes that can be employed in the present compositions include a protease, an amylase, a lipase, a cellulase, a peroxidase, a gluconase, or a mixture thereof. Preferably the detersive enzyme is a protease, an amylase, a lipase, or a mixture thereof. Preferred proteases include an alkaline protease, such as a subtilisin. Preferred amylases include an endoamylase. Preferred lipases include a lipolase.

The composition can also include additional ingredients such as a source of calcium ions, a polyol, a builder, a dye, or a combination thereof. Preferably, the present composition includes an amphoteric surfactant, a protease, an amylase, and/or a lipase, potassium borate, calcium chloride, propylene glycol, citric acid salt, and a dye. Preferably these ingredients are present at about 8% by weight surfactant, about 2% by weight protease, about 10% to about 15% by weight boric acid salt, about 0.25% by weight calcium chloride, about 8% by weight propylene glycol, about 4% to about 7% by weight citric acid salt, and about 0.02% by weight dye.

DETAILED DESCRIPTION OF THE INVENTION

Definitions

Figure 1:
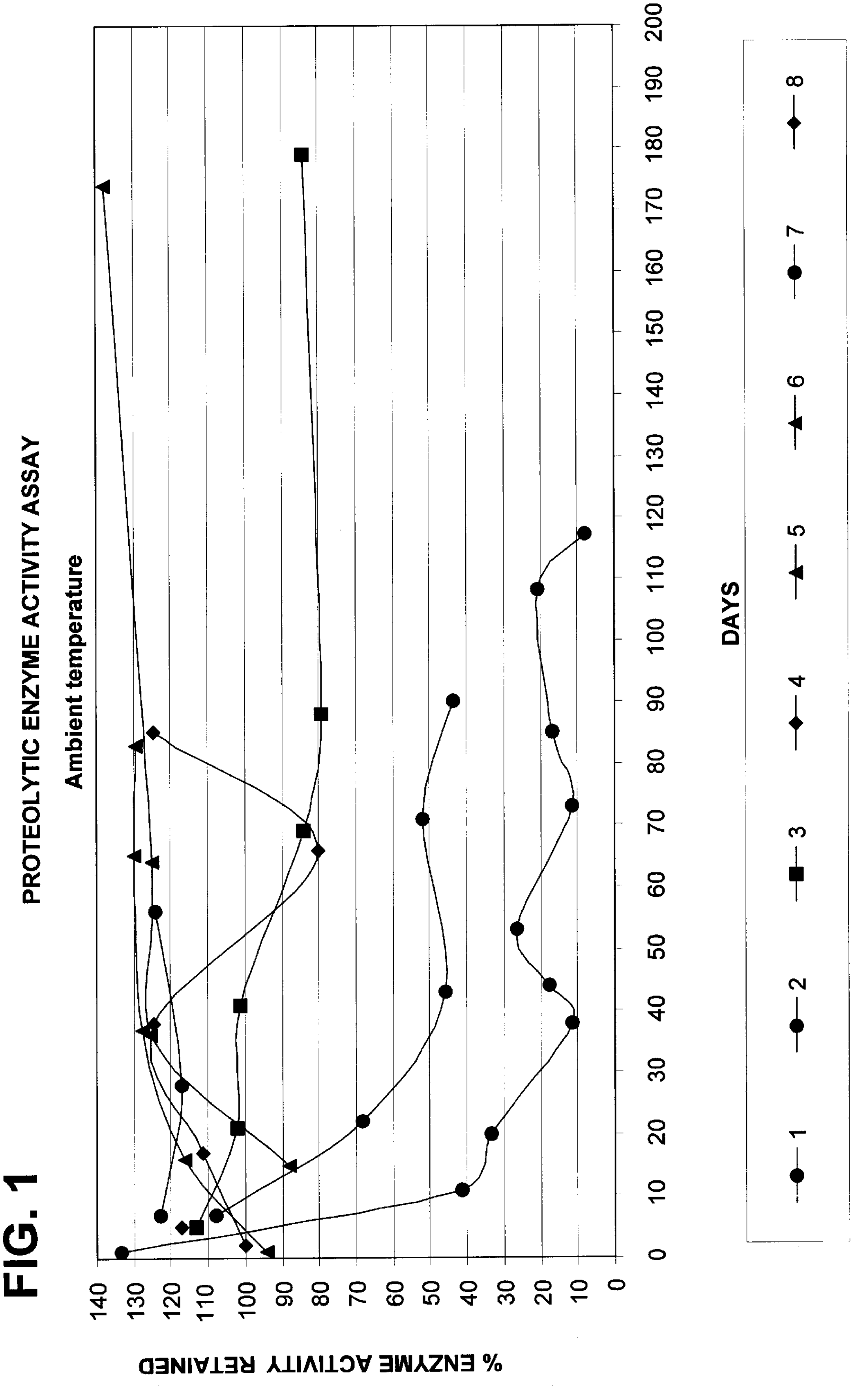
FIG. 1 illustrates the amount of enzyme activity remaining in enzyme cleaning compositions with time at ambient temperature for each of formulas 1–8.

As used herein, weight percent, percent by weight, % by weight, and the like are synonyms that refer to the concentration of a substance as the weight of that substance divided by the weight of the composition and multiplied by 100.

As used herein, boric acid salt and borate salt are used interchangeably to refer to a salt such as potassium borate or another salt obtained by or that can be visualized as being obtained by neutralization of boric acid. The weight percent of a boric acid salt or borate salt in a composition of the present invention can be expressed either as the weight percent of either the negatively charged boron containing ion, e.g. the borate or boric acid moieties, or as the weight percent of the entire boric acid salt, e.g. both the negatively charged moiety and the positively charged moiety. Preferably, the weight percent refers to the entire boric acid salt. Weight percents of citric acid salts, or other acid salts, can also be expressed in these ways, preferably with reference to the entire acid salt.

As used herein, basic or alkaline pH refers to pH greater than 7, preferably greater than 8 and up to about 14. Preferably basic or alkaline pH is in the range of about 8 to about 11. A preferred alkaline or basic pH value is in the range of about 9 to about 10.

As used herein, ambient temperature refers to the temperature of the surroundings of the liquid enzyme cleaning composition under normal conditions for storage or transportation. Although the product may be stored and transported at temperatures in the range of about −10° F. to about 100° F., ambient temperature preferably refers to room temperature of about 72° F. or 25° C.

A Stabilized Enzyme Cleaning Composition

The present invention relates to a liquid enzyme cleaning composition that employs a boric acid salt to provide improved enzyme stability at basic pH and in the presence of concentrations of water greater than about 50 to about 60 weight percent. In particular, the present cleaning composition containing a boric acid salt provides increased stability for proteases, for amylases, for other enzymes employed with proteases, and for detersive enzymes employed in the absence of proteases. Preferably, the boric acid salt is potassium borate. The boric acid salt, e.g. potassium borate, can be obtained by any of a variety of routes. For example, commercially available boric acid salt, e.g. potassium borate, can be added to the composition. Alternatively, the boric acid salt, e.g. potassium borate, can be obtained by neutralizing boric acid with a base, e.g. a potassium containing base such as potassium hydroxide.

Suitable boric acid salts provide alkalinity to the stabilized enzyme cleaning solution. Such salts include alkali metal boric acid salts; amine boric acid salts, preferably alkanolamine boric acid salts; and the like; or a combination thereof. Preferred boric acid salts include potassium borate, monoethanolammonium borate, diethanolammonium borate, triethanolammonium borate, and the like, or a combination thereof Potassium borate is a more preferred boric acid salt. The boric acid salt is preferably soluble in the composition of the invention at concentrations in excess of 5% by weight, preferably up to about 20% by weight, such as about 10% by weight, preferably about 15% by weight.

Advantageously, potassium borate is soluble at concentrations larger than other metal boric acid salts, particularly other alkali metal boric acid salts, particularly sodium borate. Potassium borate is employed and soluble in the present enzyme cleaning compositions at concentrations up to about 20 weight percent, preferably about 5 to about 20 weight percent, preferably about 15% by weight, preferably about 10 weight percent. Preferably this high solubility is obtained at alkaline pH, such as pH about 9 to about 10.

Potassium borate provides desirable increases in enzyme stability at basic pH compared to other buffer systems suitable for maintaining a pH above about 7, preferably above about 8, preferably in the range of about 8 to about 11, more preferably about 9 to about 10. Maintaining an alkaline pH provides greater cleaning power both for most surfactants present in the cleaning composition and for the detersive enzyme, particularly when the enzyme is an alkaline protease.

Potassium borate can also provide desirable increases in enzyme stability, compared to other buffer systems and agents for increasing enzyme stability, as water concentration is increased. Preferably, the present potassium borate compositions provide increased stability at concentrations of water in excess of about 60 weight percent, preferably above 65 weight percent. The upper limit to the concentration of water is set only by the amounts of other desirable or useful components of the enzyme cleaning composition. That is, water can make up the entirety of the composition beyond the useful or desirable surfactant, enzyme, boric acid salt, and any additional ingredients. Typically, an upper limit for the water concentration will be about 85 weight percent. Thus the concentration of water in the present stabilized enzyme cleaning composition can be, for example, from about 60 weight percent to about 85 weight percent water, preferably from about 60 weight percent to about 75 weight percent water, preferably 62% to 69–72% by weight water. For example, the concentration of water in the present stabilized enzyme cleaning composition can be in a range from at least about 60%, 61%, 62%, 63%, 64%, 65%, 66%, 67%, 68%, 69%, 70%, 71%, or 72% by weight water up to about 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, or 85% by weight water (always selecting an upper limit that is greater than or equal to the lower limit). Advantageously, water can replace other, more expensive, solvents, cosolvents, or enzyme stabilizers employed in conventional presoak or cleaning compositions.

In an embodiment, the present stabilized enzyme cleaning composition includes a surfactant, a detersive enzyme, a boric acid salt, and at least about 60% by weight water. Such a formulation can, preferably, be effective to stabilize the detersive enzyme at about 100% of the detersive enzyme's initial activity at ambient temperature for at least about 11 months after forming the composition. In an embodiment, the present stabilized enzyme cleaning composition includes a surfactant, a detersive enzyme, a potassium borate, and at least about 60% by weight water. In another embodiment, the present stabilized enzyme cleaning composition includes a surfactant, a detersive enzyme, a boric acid salt, and at least about 80% by weight water.

In each embodiment, the stabilized enzyme cleaning solution can also contain other ingredients, such as a source of calcium ions, a polyol, a builder, a dye, or a combination thereof. In a preferred embodiment, the surfactant includes an amphoteric surfactant, the detersive enzyme includes a protease, the boric acid salt includes potassium borate, the source of calcium ions includes calcium chloride, the polyol includes propylene glycol, the builder includes citric acid salt, the dye includes a dye sold under the trade name Acid Green 25, or a combination of these. In a more preferred embodiment, the composition of the invention includes about 8% by weight surfactant, about 2% by weight protease, about 10% to about 15% by weight boric acid salt, about 0.25% by weight calcium chloride, about 8% by weight propylene glycol, about 4 to about 7% by weight citric acid salt, and about 0.02% by weight Acid Green 25.

The boric acid salt, e.g. potassium borate, in the composition of the present invention can provide advantageous stability to the enzyme or enzymes employed, compared to a composition lacking the boric acid salt. The composition of the present invention can maintain stability of an enzyme and/or prevent one enzyme from degrading another enzyme. For example, the present composition can reduce protease activity in the composition before use to a level that the protease does not unacceptably degrade another enzyme in the composition, such as an amylase. The protease typically degrades less than about 20% of another enzyme's activity in about 4 weeks at ambient temperature, preferably less than about 10%, less than about 5%, less than about 2%, or less than about 1%.

The composition of the present invention can also enhance the activity of an enzyme. That is, the enzyme exhibits greater activity after formulation in a composition of the invention than does control enzyme formulated in a control composition or direct from the supplier.

The boric acid salt, e.g. potassium borate, can provide significantly greater enzyme stability at ambient temperature and at one or more temperatures above ambient, or under other conditions indicative of storage and use stability. For example, preferably, in the present composition, the detersive enzyme retains at least about 80–100% of its initial activity at ambient temperature for at least about 30 days after forming the composition; the detersive enzyme retains at least about 80–100% of its initial activity at ambient temperature for at least about 50 days after forming the composition; the detersive enzyme retains at least about 80–100% of its initial activity at ambient temperature for at least about 80 days after forming the composition; and/or the detersive enzyme retains at least about 80–100% of its initial activity at ambient temperature for at least about 11 months after forming the composition. Preferably, in the present composition, the detersive enzyme retains at least about 80–100% of its initial activity at 100° F. for at least about 50 days after forming the composition and/or retains at least about 50% of its initial activity at 120° F. for at least about 25 days after forming the composition.

Enzyme stability and activity are typically measured by methods known to those of skill in the art. For example, the activity of the enzyme can be measured with a known enzyme assay at the time the composition is formulated and then again after the composition has been exposed to desired conditions of temperature, humidity, or the like for a predetermined time. Comparing the activity obtained after exposure to the activity at an earlier time or at formulation provides a measure of enzyme stability. Suitable assays for a detersive protease include assays known to those of skill in the art and employing an azocasein substrate. Suitable assays for a detersive amylase include the Phadebas® assay for determining α-amylase activity, which is known to those of skill in the art. Enzyme assays typically include some error in the determination of enzyme activity, and that error can typically be as much as about 20%, or sometimes more. Thus, an enzyme that retains full activity (or 100% of its initial activity) may show as little as about 80% of that activity in an enzyme assay. Known protocols including replicate assays and statistical analysis can be employed for determining whether the activity present is equal to (within experimental error) the initial activity, or a particular fraction of that initial activity.

The stabilized enzyme cleaning composition of the present invention can be employed with a variety of different surfactants, enzymes, and additional ingredients to form a variety of cleaning, destaining, and sanitizing products useful for cleaning a wide variety of articles that can be cleaned or presoaked. Preferably, the composition of the invention is formulated for cleaning or presoaking utensils, dish or cooking ware, laundry, textiles, food processing surfaces, and the like. The composition of the invention can be employed for cleaning, destaining, and sanitizing products for presoaks, machine ware washing, laundry and textile cleaning and destaining, carpet cleaning and destaining, cleaning-in-place (CIP) cleaning and destaining, drain cleaning, presoaks for medical and/or dental instrument cleaning, and washing or presoaks for meat cutting the equipment and other food processing surfaces.

Enzymes

The present stabilized enzyme cleaning composition of the present invention preferably includes one or more enzymes, which can provide desirable activity for removal of protein-based, carbohydrate-based, or triglyceride-based stains from substrates; for cleaning, destaining, and sanitizing presoaks, such as presoaks for flatware, cups and bowls, and pots and pans; presoaks for medical and dental instruments; or presoaks for meat cutting equipment; for machine warewashing; for laundry and textile cleaning and destaining; for carpet cleaning and destaining; for cleaning-in-place and destaining-in-place; for cleaning and destaining food processing surfaces and equipment; for drain cleaning; presoaks for cleaning; and the like. Although not limiting to the present invention, enzymes suitable for the stabilized enzyme cleaning compositions can act by degrading or altering one or more types of soil residues encountered on a surface or textile thus removing the soil or making the soil more removable by a surfactant or other component of the cleaning composition. Both degradation and alteration of soil residues can improve detergency by reducing the physicochemical forces which bind the soil to the surface or textile being cleaned, i.e. the soil becomes more water soluble. For example, one or more proteases can cleave complex, macromolecular protein structures present in soil residues into simpler short chain molecules which are, of themselves, more readily desorbed from surfaces, solubilized or otherwise more easily removed by detersive solutions containing said proteases.

Suitable enzymes include a protease, an amylase, a lipase, a gluconase, a cellulase, a peroxidase, or a mixture thereof of any suitable origin, such as vegetable, animal, bacterial, fungal or yeast origin. Preferred selections are influenced by factors such as pH-activity and/or stability optima, thermostability, and stability to active detergents, builders and the like. In this respect bacterial or fungal enzymes are preferred, such as bacterial amylases and proteases, and fungal cellulases. Preferably the enzyme is a protease, a lipase, an amylase, or a combination thereof.

"Detersive enzyme", as used herein, means an enzyme having a cleaning, destaining or otherwise beneficial effect as a component of a stabilized enzyme cleaning composition for laundry, textiles, warewashing, cleaning-in-place, drains, carpets, medical or dental instruments, meat cutting tools, hard surfaces, personal care, or the like. Preferred detersive enzymes include a hydrolase such as a protease, an amylase, a lipase, or a combination thereof. Preferred enzymes in stabilized enzyme cleaning compositions for warewashing or cleaning-in-place include a protease, an amylase, a cellulase, a lipase, a peroxidase, or a combination thereof. Preferred enzymes in stabilized enzyme cleaning compositions for food processing surfaces and equipment include a protease, a lipase, an amylase, a gluconase, or a combination thereof. Preferred enzymes in stabilized enzyme cleaning compositions for laundry or textiles include a protease, a cellulase, a lipase, a peroxidase, or a combination thereof. Preferred enzymes in stabilized enzyme cleaning compositions for medical or dental instruments include a protease, a lipase, or a combination thereof. Preferred enzymes in stabilized enzyme cleaning compositions for carpets include a protease, an amylase, or a combination thereof. Preferred enzymes in stabilized enzyme cleaning compositions for meat cutting tools include a protease, a lipase, or a combination thereof Preferred enzymes in stabilized enzyme cleaning compositions for hard surfaces include a protease, a lipase, an amylase, or a combination thereof. Preferred enzymes in stabilized enzyme cleaning compositions for drains include a protease, a lipase, an amylase, or a combination thereof.

Enzymes are normally incorporated into a stabilized enzyme cleaning composition according to the invention in an amount sufficient to yield effective cleaning during a washing or presoaking procedure. An amount effective for cleaning refers to an amount that produces a clean, sanitary, and, preferably, corrosion free appearance to the material cleaned, particularly for flatware. An amount effective for cleaning also can refer to an amount that produces a cleaning, stain removal, soil removal, whitening, deodorizing, or freshness improving effect on substrates such as utensils, pots and pans, dishware, fabrics, and the like. Typically such a cleaning effect can be achieved with amounts of enzyme from about 0.1% to about 3% by weight, preferably about 1% to about 3% by weight, of the stabilized enzyme cleaning composition. Higher active levels may also be desirable in highly concentrated cleaning or presoak formulations. A presoak is preferably formulated for use upon a dilution of about 1:500, or to a formulation concentration of 2000 ppm, which puts the use concentration of the enzyme at about 10 to about 30 ppm.

Commercial enzymes, such as alkaline proteases, are obtainable in liquid or dried form, are sold as raw aqueous solutions or in assorted purified, processed and compounded forms, and include about 2% to about 80% by weight active enzyme generally in combination with stabilizers, buffers, cofactors, impurities and inert vehicles. The actual active enzyme content depends upon the method of manufacture and is not critical, assuming the stabilized enzyme cleaning composition has the desired enzymatic activity. The particular enzyme chosen for use in the process and products of this invention depends upon the conditions of final utility, including the physical product form, use pH, use temperature, and soil types to be degraded or altered. The enzyme can be chosen to provide optimum activity and stability for any given set of utility conditions.

The stabilized enzyme cleaning compositions of the present invention preferably include at least a protease. The stabilized enzyme cleaning composition of the invention has further been found, surprisingly, not only to stabilize protease for a substantially extended shelf life, but also to significantly enhance protease activity toward digesting proteins and enhancing soil removal. Further, enhanced protease activity occurs in the presence of one or more additional enzymes, such as amylase, cellulase, lipase, peroxidase, endoglucanase enzymes and mixtures thereof, preferably lipase or amylase enzymes.

A valuable reference on enzymes is "Industrial Enzymes", Scott, D., in *Kirk-Othmer Encyclopedia of Chemical Technology,* 3rd Edition, (editors Grayson, M. and EcKroth, D.) Vol. 9, pp. 173–224, John Wiley & Sons, New York, 1980.

Protease

A protease suitable for the stabilized enzyme cleaning composition of the present invention can be derived from a plant, an animal, or a microorganism. Preferably the protease is derived from a microorganism, such as a yeast, a mold, or a bacterium. Preferred proteases include serine proteases active at alkaline pH, preferably derived from a strain of Bacillus such as *Bacillus subtilis* or *Bacillus licheniformis*; these preferred proteases include native and recombinant subtilisins. The protease can be purified or a component of a microbial extract, and either wild type or variant (either chemical or recombinant). A preferred protease is neither inhibited by a metal chelating agent (sequestrant) or a thiol poison nor activated by metal ions or reducing agents, has a broad substrate specificity, is inhibited by diisopropylfluorophosphate (DFP), is an endopeptidase, has a molecular weight in the range of about 20,000 to about 40,000, and is active at a pH of about 6 to about 12 and at temperatures in a range from about 20° C. to about 80° C.

Examples of proteolytic enzymes which can be employed in the stabilized enzyme cleaning composition of the invention include (with trade names) Savinase®; a protease derived from *Bacillus lentus* type, such as Maxacal®, Opticlean®, Durazym®, and Properase®; a protease derived from *Bacillus licheniformis*, such as Alcalase®and Maxatase®; and a protease derived from *Bacillus amyloliquefaciens*, such as Primase®. Preferred commercially available protease enzymes include those sold under the trade names Alcalase®, Savinase®, Primase®, Durazym®, or Esperase® by Novo Industries A/S (Denmark); those sold under the trade names Maxatase®, Maxacal®, or Maxapem® by Gist-Brocades (Netherlands); those sold under the trade names Purafect®, Purafect OX, and Properase by Genencor International; those sold under the trade names Opticlean® or Optimase® by Solvay Enzymes; and the like. A mixture of such proteases can also be used. For example, Purafect® is a preferred alkaline protease (a subtilisin) for use in detergent compositions of this invention having application in lower temperature cleaning programs, from about 30° C. to about 65° C.; whereas, Esperase® is an alkaline protease of choice for higher temperature detersive solutions, from about 50° C. to about 85° C. Suitable detersive proteases are described in patent publications including: GB 1,243,784, WO 9203529 A (enzyme/inhibitor system), WO 9318140 A, and WO 9425583 (recombinant trypsin-like protease) to Novo; WO 9510591 A, WO 9507791 (a protease having decreased adsorption and increased hydrolysis), WO 95/30010, WO 95/30011, WO 95/29979, to Procter & Gamble; WO 95/10615 (*Bacillus amyloliquefaciens* subtilisin) to Genencor International; EP 130,756 A (protease A); EP 303,761 A (protease B); and EP 130,756 A. A variant protease employed in the present stabilized enzyme cleaning compositions is preferably at least 80% homologous, preferably having at least 80% sequence identity, with the amino acid sequences of the proteases in these references.

In preferred embodiments of this invention, the amount of commercial alkaline protease composite present in the composition of the invention ranges from about 0.1% by weight of detersive solution to about 3% by weight, preferably about 1% to about 3% by weight, preferably about 2% by weight, of solution of the commercial enzyme product. Typical commercially available detersive enzymes include about 5–10% of active enzyme.

Whereas establishing the percentage by weight of commercial alkaline protease required is of practical convenience for manufacturing embodiments of the present teaching, variance in commercial protease concentrates and in-situ environmental additive and negative effects upon protease activity require a more discerning analytical technique for protease assay to quantify enzyme activity and establish correlations to soil residue removal performance and to enzyme stability within the preferred embodiment; and, if a concentrate, to use-dilution solutions. The activity of the proteases for use in the present invention are readily expressed in terms of activity units—more specifically, Kilo-Novo Protease Units (KNPU) which are azocasein assay activity units well known to the art. A more detailed discussion of the azocasein assay procedure can be found in the publication entitled "The Use of Azoalbumin as a Substrate in the Colorimetric Determination of Peptic and Tryptic Activity", Tomarelli, R. M., Charney, J., and Harding, M. L., *J. Lab. Clin. Chem.* 34, 428 (1949).

In preferred embodiments of the present invention, the activity of proteases present in the use-solution ranges from about $1\times10^{-5}$ KNPU/gm solution to about $4\times10^{-3}$ KNPU/gm solution.

Naturally, mixtures of different proteolytic enzymes may be incorporated into this invention. While various specific enzymes have been described above, it is to be understood that any protease which can confer the desired proteolytic activity to the composition may be used and this embodiment of this invention is not limited in any way by specific choice of proteolytic enzyme.

Amylase

An amylase suitable for the stabilized enzyme cleaning composition of the present invention can be derived from a plant, an animal, or a microorganism. Preferably the amylase is derived from a microorganism, such as a yeast, a mold, or a bacterium. Preferred amylases include those derived from a Bacillus, such as *B. licheniformis, B. amyloliquefaciens, B. subtilis,* or *B. stearothermophilus.* The amylase can be purified or a component of a microbial extract, and either wild type or variant (either chemical or recombinant), preferably a variant that is more stable under washing or presoak conditions than a wild type amylase.

Examples of amylase enzymes that can be employed in the stabilized enzyme cleaning composition of the invention include those sold under the trade name Rapidase by Gist-Brocades® (Netherlands); those sold under the trade names Termamyl®, Fungamyl® or Duramyl® by Novo; Purastar STL or Purastar OXAM by Genencor; and the like. Preferred commercially available amylase enzymes include the stability enhanced variant amylase sold under the trade name Duramyl® by Novo. A mixture of amylases can also be used.

Amylases suitable for the stabilized enzyme cleaning compositions of the present invention, preferably for warewashing, include: α-amylases described in WO 95/26397, PCT/DK96/00056, and GB 1,296,839 to Novo; and stability enhanced amylases described in J. Biol. Chem., 260(11):6518–6521 (1985); WO 9510603 A, WO 9509909 A and WO 9402597 to Novo; references disclosed in WO 9402597; and WO 9418314 to Genencor International. A variant α-amylase employed in the present stabilized enzyme cleaning compositions is preferably at least 80% homologous, preferably having at least 80% sequence identity, with the amino acid sequences of the proteins of these references.

Preferred amylases for use in the stabilized enzyme cleaning compositions of the present invention have enhanced stability compared to certain amylases, such as Termamyl®. Enhanced stability refers to a significant or measurable improvement in one or more of: oxidative stability, e.g., to hydrogen peroxide/tetraacetylethylenediamine in buffered solution at pH 9–10; thermal stability, e.g., at common wash temperatures such as about 60° C.; and/or alkaline stability, e.g., at a pH from about 8 to about I 1; each compared to a suitable control amylase, such as Termamyl®. Stability can be measured by methods known to those of skill in the art. Preferred enhanced stability amylases for use in the stabilized enzyme cleaning compositions of the present invention have a specific activity at least 25% higher than the specific activity of Termanyl® at a temperature in a range of 25° C. to 55° C. and at a pH in a range of about 8 to about 10. Amylase activity for such comparisons can be measured by assays known to those of skill in the art and/or commercially available, such as the Phadebas® α-amylase assay.

In preferred embodiments of this invention, the amount of commercial amylase present in the composition of the invention ranges from about 0.1% by weight of detersive solution to about 3% by weight, preferably about 1% to about 3% by weight, preferably about 2% by weight, of solution of the commercial enzyme product. Typical commercially available detersive enzymes include about 0.25–5% of active amylase.

Whereas establishing the percentage by weight of amylase required is of practical convenience for manufacturing embodiments of the present teaching, variance in commercial amylase concentrates and in-situ environmental additive and negative effects upon amylase activity may require a more discerning analytical technique for amylase assay to quantify enzyme activity and establish correlations to soil residue removal performance and to enzyme stability within the preferred embodiment; and, if a concentrate, to use-dilution solutions. The activity of the amylases for use in the present invention can be expressed in units known to those of skill or through amylase assays known to those of skill in the art and/or commercially available, such as the Phadebas® α-amylase assay.

Naturally, mixtures of different amylase enzymes can be incorporated into this invention. While various specific enzymes have been described above, it is to be understood that any amylase which can confer the desired amylase activity to the composition can be used and this embodiment of this invention is not limited in any way by specific choice of amylase enzyme.

Cellulases

An cellulase suitable for the stabilized enzyme cleaning composition of the present invention can be derived from a plant, an animal, or a microorganism. Preferably the cellulase is derived from a microorganism, such as a fungus or a bacterium. Preferred cellulases include those derived from a fungus, such as *Humicola insolens*, Humicola strain DSM1800, or a cellulase 212-producing fungus belonging to the genus Aeromonas and those extracted from the hepatopancreas of a marine mollusk, *Dolabella Auricula Solander*. The cellulase can be purified or a component of an extract, and either wild type or variant (either chemical or recombinant).

Examples of cellulase enzymes that can be employed in the stabilized enzyme cleaning composition of the invention include those sold under the trade names Carezyme® or Celluzyme® by Novo, or Cellulase by Genencor; and the like. A mixture of cellulases can also be used. Suitable cellulases are described in patent documents including: U.S. Pat. No. 4,435,307, GB-A-2.075.028, GB-A-2.095.275, DE-OS-2.247.832, WO 9117243, and WO 9414951 A (stabilized cellulases) to Novo.

In preferred embodiments of this invention, the amount of commercial cellulase present in the composition of the invention ranges from about 0.1% by weight of detersive solution to about 3% by weight, preferably about 1% to about 3% by weight, of solution of the commercial enzyme product. Typical commercially available detersive enzymes include about 5–10 percent of active enzyme.

Whereas establishing the percentage by weight of cellulase required is of practical convenience for manufacturing embodiments of the present teaching, variance in commercial cellulase concentrates and in-situ environmental additive and negative effects upon cellulase activity may require a more discerning analytical technique for cellulase assay to quantify enzyme activity and establish correlations to soil residue removal performance and to enzyme stability within the preferred embodiment; and, if a concentrate, to use-dilution solutions. The activity of the cellulases for use in the present invention can be expressed in units known to those of skill or through cellulase assays known to those of skill in the art and/or commercially available.

Naturally, mixtures of different cellulase enzymes can be incorporated into this invention. While various specific enzymes have been described above, it is to be understood that any cellulase which can confer the desired cellulase activity to the composition can be used and this embodiment of this invention is not limited in any way by specific choice of cellulase enzyme.

Lipases

A lipase suitable for the stabilized enzyme cleaning composition of the present invention can be derived from a plant, an animal, or a microorganism. Preferably the lipase is derived from a microorganism, such as a fungus or a bacterium. Preferred lipases include those derived from a Pseudomonas, such as *Pseudomonas stutzeri* ATCC 19.154, or from a Humicola, such as *Humicola lanuginosa* (typically produced recombinantly in *Aspergillus oryzae*). The lipase can be purified or a component of an extract, and either wild type or variant (either chemical or recombinant).

Examples of lipase enzymes that can be employed in the stabilized enzyme cleaning composition of the invention include those sold under the trade names Lipase P "Amano" or "Amano-P" by Amano Pharmaceutical Co. Ltd., Nagoya, Japan or under the trade name Lipolase® by Novo, and the like. Other commercially available lipases that can be employed in the present compositions include Amano-CES, lipases derived from *Chromobacter viscosum*, e.g. *Chromobacter viscosum* var. *lipolyticum* NRRLB 3673 from Toyo Jozo Co., Tagata, Japan; *Chromobacter viscosum* lipases from U.S. Biochemical Corp., U.S.A. and Disoynth Co., and lipases derived from *Pseudomonas gladioli* or from *Humicola lanuginosa.*

A preferred lipase is sold under the trade name Lipolase® by Novo. Suitable lipases are described in patent documents including: WO 9414951 A (stabilized lipases) to Novo, WO 9205249, RD 94359044, GB 1,372,034, Japanese Patent Application 53,20487, laid open Feb. 24, 1978 to Amano Pharmaceutical Co. Ltd., and EP 341,947.

In preferred embodiments of this invention, the amount of commercial lipase present in the composition of the invention ranges from about 0.1% by weight of detersive solution to about 3% by weight, preferably about 1% to about 3% by weight, of solution of the commercial enzyme product. Typical commercially available detersive enzymes include about 5–10 percent of active enzyme.

Whereas establishing the percentage by weight of lipase required is of practical convenience for manufacturing embodiments of the present teaching, variance in commercial lipase concentrates and in-situ environmental additive and negative effects upon lipase activity may require a more discerning analytical technique for lipase assay to quantify enzyme activity and establish correlations to soil residue removal performance and to enzyme stability within the preferred embodiment; and, if a concentrate, to use-dilution solutions. The activity of the lipases for use in the present invention can be expressed in units known to those of skill or through lipase assays known to those of skill in the art and/or commercially available.

Naturally, mixtures of different lipase enzymes can be incorporated into this invention. While various specific enzymes have been described above, it is to be understood that any lipase which can confer the desired lipase activity to the composition can be used and this embodiment of this invention is not limited in any way by specific choice of lipase enzyme.

Additional Enzymes

Additional enzymes suitable for use in the present stabilized enzyme cleaning compositions include a cutinase, a peroxidase, a gluconase, and the like. Suitable cutinase enzymes are described in WO 8809367 A to Genencor. Known peroxidases include horseradish peroxidase, ligninase, and haloperoxidases such as chloro- or bromo-peroxidase. Peroxidases suitable for stabilized enzyme cleaning compositions are disclosed in WO 89099813 A and WO 8909813 A to Novo. Peroxidase enzymes can be used in combination with oxygen sources, e.g., percarbonate, perborate, hydrogen peroxide, and the like. Additional enzymes suitable for incorporation into the present stabilized enzyme cleaning composition are disclosed in WO 9307263 A and WO 9307260 A to Genencor International, WO 8908694 A to Novo, and U.S. Pat. No. 3,553,139 to McCarty et al., U.S. Pat. No. 4,101,457 to Place et al., U.S. Pat. No. 4,507,219 to Hughes and U.S. Pat. No. 4,261,868 to Hora et al.

An additional enzyme, such as a cutinase or peroxidase, suitable for the stabilized enzyme cleaning composition of the present invention can be derived from a plant, an animal, or a microorganism. Preferably the enzyme is derived from a microorganism. The enzyme can be purified or a component of an extract, and either wild type or variant (either chemical or recombinant). In preferred embodiments of this invention, the amount of commercial additional enzyme, such as a cutinase or peroxidase, present in the composition of the invention ranges from about 0. 1% by weight of detersive solution to about 3% by weight, preferably about 1% to about 3% by weight, of solution of the commercial enzyme product. Typical commercially available detersive enzymes include about 5–10 percent of active enzyme.

Whereas establishing the percentage by weight of additional enzyme, such as a cutinase or peroxidase, required is of practical convenience for manufacturing embodiments of the present teaching, variance in commercial additional enzyme concentrates and in-situ environmental additive and negative effects upon their activity may require a more discerning analytical technique for the enzyme assay to quantify enzyme activity and establish correlations to soil residue removal performance and to enzyme stability within the preferred embodiment; and, if a concentrate, to use-dilution solutions. The activity of the additional enzyme, such as a cutinase or peroxidase, for use in the present invention can be expressed in units known to those of skill or through assays known to those of skill in the art and/or commercially available.

Naturally, mixtures of different additional enzymes can be incorporated into this invention. While various specific enzymes have been described above, it is to be understood that any additional enzyme which can confer the desired enzyme activity to the composition can be used and this embodiment of this invention is not limited in any way by specific choice of enzyme.

Enzyme Stabilizing System

The enzyme stabilizing system of the present invention includes a boric acid salt, such as an alkali metal borate or amine (e.g. an alkanolamine) borate, preferably an alkali metal borate, more preferably potassium borate. The enzyme stabilizing system can also include other ingredients to stabilize certain enzymes or to enhance or maintain the effect of the boric acid salt.

For example, the cleaning composition of the invention can include a water-soluble source of calcium and/or magnesium ions. Calcium ions are generally more effective than magnesium ions and are preferred herein if only one type of cation is being used. Typical cleaning and/or stabilized enzyme cleaning compositions, especially liquids, will include from about 1 to about 30, preferably from about 2 to about 20, more preferably from about 8 to about 12 millimoles of calcium ion per liter of finished composition, though variation is possible depending on factors including the multiplicity, type and levels of enzymes incorporated. Preferably water-soluble calcium or magnesium salts are employed, including for example calcium chloride, calcium hydroxide, calcium formate, calcium malate, calcium maleate, calcium hydroxide and calcium acetate; more generally, calcium sulfate or magnesium salts corresponding to the listed calcium salts may be used. Further increased levels of calcium and/or magnesium may of course be useful, for example for promoting the grease-cutting action of certain types of surfactant.

Stabilizing systems of certain cleaning compositions, for example warewashing stabilized enzyme cleaning compositions, may further include from 0 to about 10%, preferably from about 0.01% to about 6% by weight, of chlorine bleach scavengers, added to prevent chlorine bleach species present in many water supplies from attacking and inactivating the enzymes, especially under alkaline conditions. While chlorine levels in water may be small, typically in the range from about 0.5 ppm to about 1.75 ppm, the available chlorine in the total volume of water that comes in contact with the enzyme, for example during warewashing, can be relatively large; accordingly, enzyme stability to chlorine in-use can be problematic. Since perborate or percarbonate, which have the ability to react with chlorine bleach, may be present in certain of the instant compositions in amounts accounted for separately from the stabilizing system, the use of additional stabilizers against chlorine, may, most generally, not be essential, though improved results may be obtainable from their use.

Suitable chlorine scavenger anions are widely known and readily available, and, if used, can be salts containing ammonium cations with sulfite, bisulfite, thiosulfite, thiosulfate, iodide, etc. Antioxidants such as carbamate, ascorbate, etc., organic amines such as ethylenediaminetetracetic acid (EDTA) or alkali metal salt thereof, monoethanolamine (MEA), and mixtures thereof can likewise be used. Likewise, special enzyme inhibition systems can be incorporated such that different enzymes have maximum compatibility. Other conventional scavengers such as bisulfate, nitrate, chloride, sources of hydrogen peroxide such as sodium perborate tetrahydrate, sodium perborate monohydrate and sodium percarbonate, as well as phosphate, condensed phosphate, acetate, benzoate, citrate, formate, lactate, malate, tartrate, salicylate, etc., and mixtures thereof can be used if desired.

In general, since the chlorine scavenger function can be performed by ingredients separately listed under better recognized functions, there is no requirement to add a separate chlorine scavenger unless a compound performing that function to the desired extent is absent from an enzyme-containing embodiment of the invention; even then, the scavenger is added only for optimum results. Moreover, the formulator will exercise a chemist's normal skill in avoiding the use of any enzyme scavenger or stabilizer which is unacceptably incompatible, as formulated, with other reactive ingredients. In relation to the use of ammonium salts, such salts can be simply admixed with the stabilized enzyme cleaning composition but are prone to adsorb water and/or liberate ammonia during storage. Accordingly, such materials, if present, are desirably protected in a particle such as that described in U.S. Pat. No. 4,652,392, Baginski et al.

Surfactant

The surfactant or surfactant admixture of the present invention can be selected from water soluble or water dispersible nonionic, semi-polar nonionic, anionic, cationic, amphoteric, or zwitterionic surface-active agents; or any combination thereof. The particular surfactant or surfactant mixture chosen for use in the process and products of this invention can depend on the conditions of final utility, including method of manufacture, physical product form, use pH, use temperature, foam control, and soil type. Surfactants incorporated into the stabilized enzyme cleaning compositions of the present invention are preferably enzyme compatible, not substrates for the enzyme, and not inhibitors or inactivators of the enzyme. For example, when proteases and amylases are employed in the present compositions, the surfactant is preferably free of peptide and glycosidic bonds. In addition, certain cationic surfactants are known in the art to decrease enzyme effectiveness.

A preferred surfactant system of the invention can be selected from amphoteric species of surface-active agents, which offer diverse and comprehensive commercial selection, low price; and, most important, excellent detersive effect—meaning surface wetting, soil penetration, soil removal from the surface being cleaned, and soil suspension in the detergent solution. Despite this preference the present composition can include one or more of nonionic surfactants, anionic surfactants, cationic surfactants, the sub-class of nonionic entitled semi-polar nonionics, or those surface-active agents which are characterized by persistent cationic and anionic double ion behavior, thus differing from classical amphoteric, and which are classified as zwitterionic surfactants.

Generally, the concentration of surfactant or surfactant mixture useful in stabilized liquid enzyme compositions of the present invention fall in the range of from about 0.5% to about 40% by weight of the composition, preferably about 2% to about 10%, preferably about 5% to about 8%. These percentages can refer to percentages of the commercially available surfactant composition, which can contain solvents, dyes, odorants, and the like in addition to the actual surfactant. In this case, the percentage of the actual surfactant chemical can be less than the percentages listed. These percentages can refer to the percentage of the actual surfactant chemical.

Preferred surfactants for the compositions of the invention include amphoteric surfactants, such as dicarboxylic coconut derivative sodium salts.

A typical listing of the classes and species of surfactants useful herein appears in U.S. Pat. No. 3,664,961 issued May 23, 1972, to Norris.

Nonionic Surfactant

Nonionic surfactants useful in the invention are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants in the present invention include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp.

Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule.

Tetronic® compounds are tetra-functional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.

4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics® are manufactured by BASF Corporation under the trade name Pluronic® R surfactants.

Likewise, the Tetronic® R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat No. 2,903,486 issued Sept. 8, 1959 to Brown et al. and represented by the formula

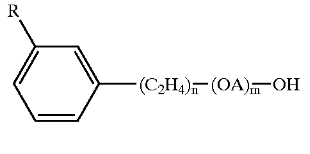

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$, wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$%, wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R^2CONR^1Z$ in which: R1 is H, $C_1$–$C_4$ hydrocarbyl, 2-hydroxy ethyl, 2-hydroxy propyl, ethoxy, propoxy group, or a mixture thereof; $R_2$ is a $C_5$–$C_{31}$hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$–$C_{18}$ fatty alcohols and $C_6$–$C_{18}$ mixed ethoxylated and propoxylated fatty alcohols are suitable surfactants for use in the present compositions, particularly those that are water soluble. Suitable ethoxylated fatty alcohols include the $C_{10}$–$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R^6CON(R^7)_2$ in which $R^6$ is an alkyl group containing from 7 to 21 carbon atoms and each $R^7$ is independently hydrogen, $C_1$–$C_4$ alkyl, $C_1$–$C_4$ hydroxyalkyl, or —$(C_{24}O)_x$ H, where x is in the range of from 1 to 3.

Preferred nonionic surfactants for the compositions of the invention include alcohol alkoxylates, EO/PO block copolymers, alkylphenol alkoxylates, and the like.

The treatise *Nonionic Surfactants,* edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

13. Amine oxides are tertiary amine oxides corresponding to the general formula:

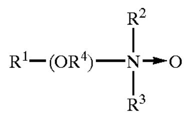

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1–3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

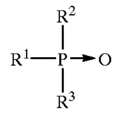

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis (hydroxymethyl)tetradecylphosphine oxide.

Semi-polar nonionic surfactants useful herein also include the water soluble sulfoxide compounds which have the structure:

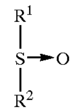

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Preferred semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility.

As those skilled in the art understand, anionics are excellent detersive surfactants and are therefore, favored additions to heavy duty detergent compositions. Generally, however, anionics have high foam profiles which limit their use alone or at high concentration levels in cleaning systems such as CIP circuits that require strict foam control. Anionics are very useful additives to preferred compositions of the present invention. Further, anionic surface active compounds are useful to impart special chemical or physical properties other than detergency within the composition. Anionics can be employed as gelling agents or as part of a gelling or thickening system. Anionics are excellent solubilizers and can be used for hydrotropic effect and cloud point control.

The majority of large volume commercial anionic surfactants can be subdivided into five major chemical classes and additional sub-groups known to those of skill in the art and described in "Surfactant Encyclopedia", *Cosmetics & Toiletries*, Vol. 104 (2) 71–86 (1989). The first class includes acylamino acids (and salts), such as acylgluamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes phosphoric acid esters and their salts. The fourth class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like. Although each of these classes of anionic surfactants can be employed in the present compositions, it should be noted that certain of these anionic surfactants may be incompatible with the enzymes incorporated into the present invention. For example, the acyl-amino acids and salts may be incompatible with proteolytic enzymes because of their peptide structure.

Anionic sulfate surfactants suitable for use in the present compositions include the linear and branched primary and secondary alkyl sulfates, alkyl ethoxysulfates, fatty oleyl glycerol sulfates, alkyl phenol ethylene oxide ether sulfates, the $C_5$–$C_{17}$ acyl-N—($C_1$–$C_4$ alkyl) and —N—($C_1$–$C_2$ hydroxyalkyl) glucamine sulfates, and sulfates of alkylpolysaccharides such as the sulfates of alkylpolyglucoside (the nonionic nonsulfated compounds being described herein).

Examples of suitable synthetic, water soluble anionic detergent compounds include the ammonium and substituted ammonium (such as mono-, di- and triethanolamine) and alkali metal (such as sodium, lithium and potassium) salts of the alkyl mononuclear aromatic sulfonates such as the alkyl benzene sulfonates containing from about 5 to about 18 carbon atoms in the alkyl group in a straight or branched chain, e.g., the salts of alkyl benzene sulfonates or of alkyl toluene, xylene, cumene and phenol sulfonates; alkyl naphthalene sulfonate, diamyl naphthalene sulfonate, and dinonyl naphthalene sulfonate and alkoxylated derivatives.

Anionic carboxylate surfactants suitable for use in the present compositions include the alkyl ethoxy carboxylates, the alkyl polyethoxy polycarboxylate surfactants and the soaps (e.g. alkyl carboxyls). Secondary soap surfactants (e.g. alkyl carboxyl surfactants) useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary soap surfactants typically contain no ether linkages, no ester linkages and no hydroxyl groups. Further, they typically lack nitrogen atoms in the head-group (amphiphilic portion). Suitable secondary soap surfactants typically contain 11–13 total carbon atoms, although more carbons atoms (e.g., up to 16) can be present.

Other anionic detergents suitable for use in the present compositions include olefin sulfonates, such as long chain alkene sulfonates, long chain hydroxyalkane sulfonates or mixtures of alkenesulfonates and hydroxyalkane-sulfonates. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule. Resin acids and hydrogenated resin acids are also suitable, such as rosin, hydrogenated rosin, and resin acids and hydrogenated resin acids present in or derived from tallow oil.

The particular salts will be suitably selected depending upon the particular formulation and the needs therein.

Further examples of suitable anionic surfactants are given in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

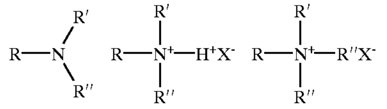

in which, R represents a long alkyl chain, R', R", and R'" may be either long alkyl chains or smaller alkyl or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86–96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1m$ $R^2{}_xY_LZ$ wherein each $R^1$ is an organic group containing a straight or branched alkyl or alkenyl group optionally substituted with up to three phenyl or hydroxy groups and optionally interrupted by up to four of the following structures:

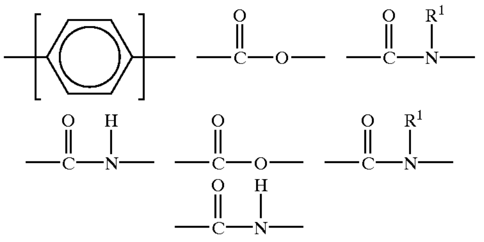

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y is can be a group including, but not limited to:

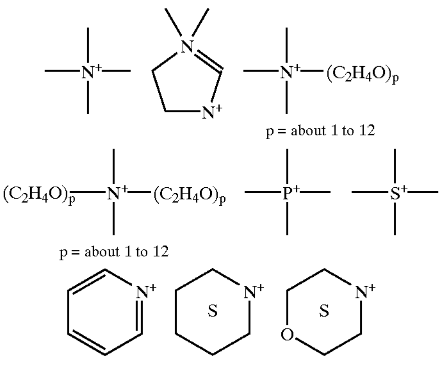

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries,* Vol. 104 (2) 69–71 (1989). The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

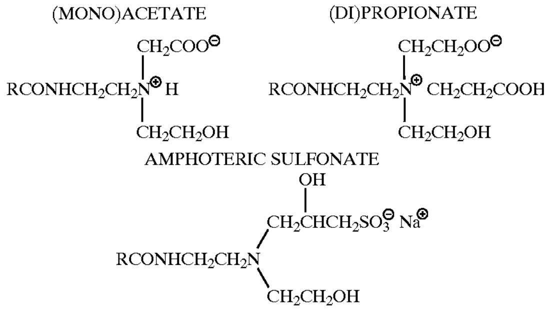

Neutral pH-Zwitterion wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Preferred amphocarboxylic acids are produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R{=}C_8$–$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H^4COOM$. In these R is preferably an acyclic hydrophobic group containing from about 8 to about 18 carbon atoms, and M is a cation to neutralize the charge of the anion.

Preferred amphoteric surfactants include those derived from coconut products such as coconut oil or coconut fatty acid. The more preferred of these coconut derived surfactants include as part of their structure an ethylenediamine moiety, an alkanolamide moiety, an amino acid moiety, preferably glycine, or a combination thereof; and an aliphatic substituent of from about 8 to 18 (preferably 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+(CH_2$—$CH_2$—$CO_2Na)_2$—$CH_2$—$CH_2$—OH or $C_{12}$-alkyl-C(O)—N(H)—$CH_2$—$CH_2N^+(CH_2$—$CO_2Na)_2$—$CH_2$—$CH_2$—OH. Disodium cocoampho dipropionate is one most preferred amphoteric surfactant and is commercially available under the tradename Miranol™ FBS from Rhodia Inc., Cranbury, N.J. Another most preferred coconut derived amphoteric surfactant with the chemical name disodium cocoampho diacetate is sold under the tradename Miranol™ C2M-SF Conc., also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Zwitterionic Surfactants

Zwitterionic surfactants can be thought of as a subset of the amphoteric surfactants. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong"inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. Betaine and sultaine surfactants are exemplary zwitterionic surfactants for use herein.

A general formula for these compounds is:

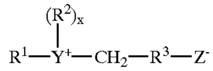

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3- [N,N-dipropy-N-3-dodecoxy-2-hydroxypropyl-ammonio]-propane-1-phosphonate; 3 -(N, N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]- propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

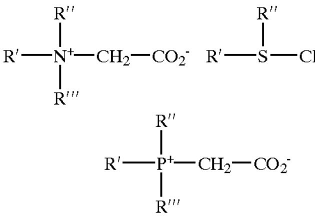

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$–$C_{18}$ hydrocarbyl group, each $R^1$ is typically independently $C_1$–$C_3$ alkyl, e.g. methyl, and $R^2$ is a $C_1$–$C_6$ hydrocarbyl group, e.g. a $C_1$–$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Surfactant Compositions

The surfactants described hereinabove can be used singly or in combination in the practice and utility of the present invention. In particular, the nonionics and anionics can be used in combination. The semi-polar nonionic, cationic, amphoteric and zwitterionic surfactants can be employed in combination with nonionics or anionics. The above examples are merely specific illustrations of the numerous surfactants which can find application within the scope of this invention. The foregoing organic surfactant compounds can be formulated into any of the several commercially desirable composition forms of this invention having disclosed utility. Said compositions are washing or presoak treatments for food or other soiled surfaces in concentrated form which, when dispensed or dissolved in water, properly diluted by a proportionating device, and delivered to the target surfaces as a solution, gel or foam will provide cleaning. Said cleaning treatments consisting of one product; or, involving a two product system wherein proportions of each are utilized. Said product is typically a concentrate of liquid or emulsion.

Additional Ingredients

The present stabilized enzyme cleaning composition can include any of a variety of ingredients typically included in enzyme or other cleaning compositions. Such ingredients include, but are not limited to, builder, divalent ion, polyol, dye, carbohydrate, and the like.

Builder

Detergent builders can optionally be included in the stabilized enzyme cleaning compositions of the present invention for purposes including assisting in controlling mineral hardness. Inorganic as well as organic builders can be used. The level of builder can vary widely depending upon the end use of the composition and its desired physical form. When present, the compositions will typically include at least 1%, preferably about 1% to about 10%, preferably about 2% to about 6%, more preferably about 4% to about 7% by weight builder.

Inorganic or phosphate-containing detergent builders include alkali metal, ammonium and alkanolammonium salts of polyphosphates (e.g. tripolyphosphates, pyrophosphates, and glassy polymeric meta-phosphates). Non-phosphate builders may also be used. These can include phytic acid, silicates, alkali metal carbonates (e.g. carbonates, bicarbonates, and sesquicarbonates), sulphates, aluminosilicates, monomeric polycarboxylates, homo or copolymeric polycarboxylic acids or their salts in which the polycarboxylic acid includes at least two carboxylic radicals separated from each other by not more than two carbon atoms, citrates, succinates, and the like. Preferred builders include citrate builders, e.g., citric acid and soluble salts thereof, due to their ability to enhance detergency of a soap or detergent solution and their availability from renewable resources and their biodegradability.

Divalent Ion

The stabilized enzyme cleaning compositions of the invention can contain a divalent ion, selected from calcium and magnesium ions, at a level of from 0.05% to 5% by weight, preferably from 0.1% to 1% by weight, more preferably about 0.25% by weight of the composition. The divalent ion can be, for example, calcium or magnesium. Calcium ions can preferably be included in the present stabilized enzyme cleaning compositions. The calcium ions can, for example, be added as a chloride, hydroxide, oxide, formate or acetate, or nitrate, preferably chloride, salt.

Polyol

The stabilized enzyme cleaning composition of the invention can also include a polyol. The polyol advantageously provides additional stability and hydrotrophic properties to the stabilized enzyme cleaning composition. Propylene glycol and sorbitol are preferred polyols.

Dye

The stabilized enzyme cleaning composition of the invention can also include a dye. The dye advantageously provides visibility of the product in a package, dispenser, and/or lines to the stabilized enzyme cleaning composition. A wide variety of dyes are suitable, including Acid Green 25 and Direct Blue 86. Preferred dyes include a dye sold under the trade name Acid Green 25.

Manual Warewashing Presoak Method

According to the manual presoaking method aspect of this invention, soiled utensils, pots, or pans are contacted with an effective amount, typically from about 0.2% to about 0.8% by weight, preferably from about 0.2% to about 0.4% by weight, of the composition of the present invention. Such an effective amount can be used to presoak, for example, about 300 utensils in about 3 to about 5 gallons of the diluted composition. The actual amount of presoak composition used will be based on the judgment of user, and will depend upon factors such as the particular product formulation of the composition, the concentration of the composition, the number of soiled articles to be presoaked and the degree of soiling of the articles. Subsequently, the items are subjected to a manual or machine washing or rinsing method, involving either further washing steps and use of detergent product, and/or to a manual or machine rinsing method.

The present invention may be better understood with reference to the following examples. These examples are intended to be representative of specific embodiments of the invention, and are not intended as limiting the scope of the invention.

EXAMPLES

Examples of stabilized enzyme cleaning compositions according to the present invention were made and the resulting enzyme stability was compared to other conventional compositions. The compositions of eight formulas that were made and compared are summarized in Table 1. The enzyme storage stability results for these compositions were determined at ambient temperature, 100° F., and 120° F. These results are summarized in FIGS. 1, 2, and 3, respectively.

enzyme. In these compositions the potassium borate was generated through the neutralization of boric acid with potassium hydroxide. Sodium borate was not sufficiently soluble to provide the concentrations achieved with potassium borate. For example, precipitate formed when sodium hydroxide was employed to neutralize boric acid at these concentrations. The exact weight percent of water in Formulas #4–#8 depends on how this value is calculated. The values shown in Table 1 do not include water that might be considered to hydrate, neutralize, or conjugate to the boric acid used to make the formula. If such water is included, the values listed for weight percent of water are increased by about 2%.

Figure 2:
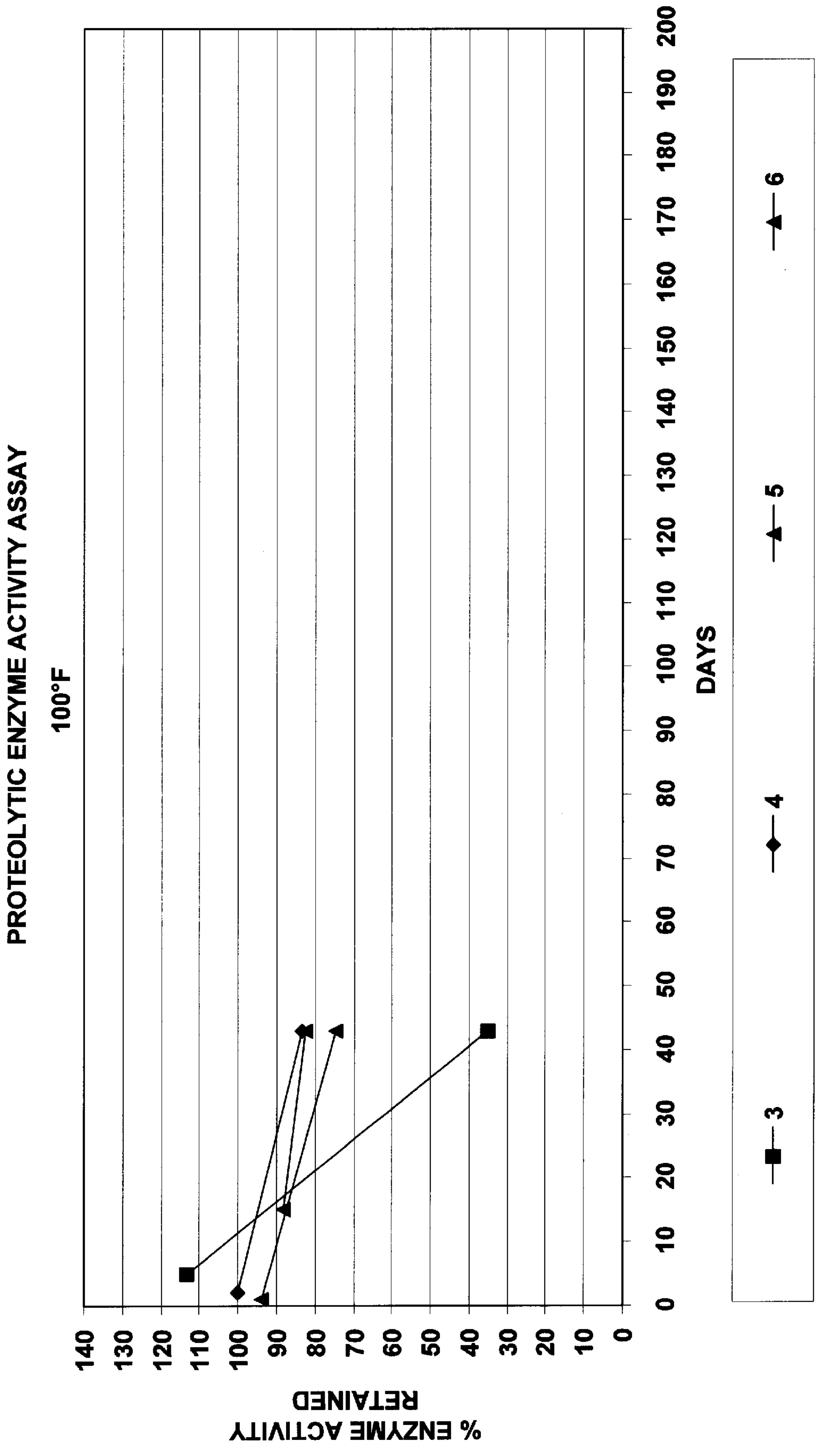
FIG. 2 illustrates the amount of enzyme activity remaining in enzyme cleaning compositions with time at 110° F. for each of formulas 3–6.
Figure 3:
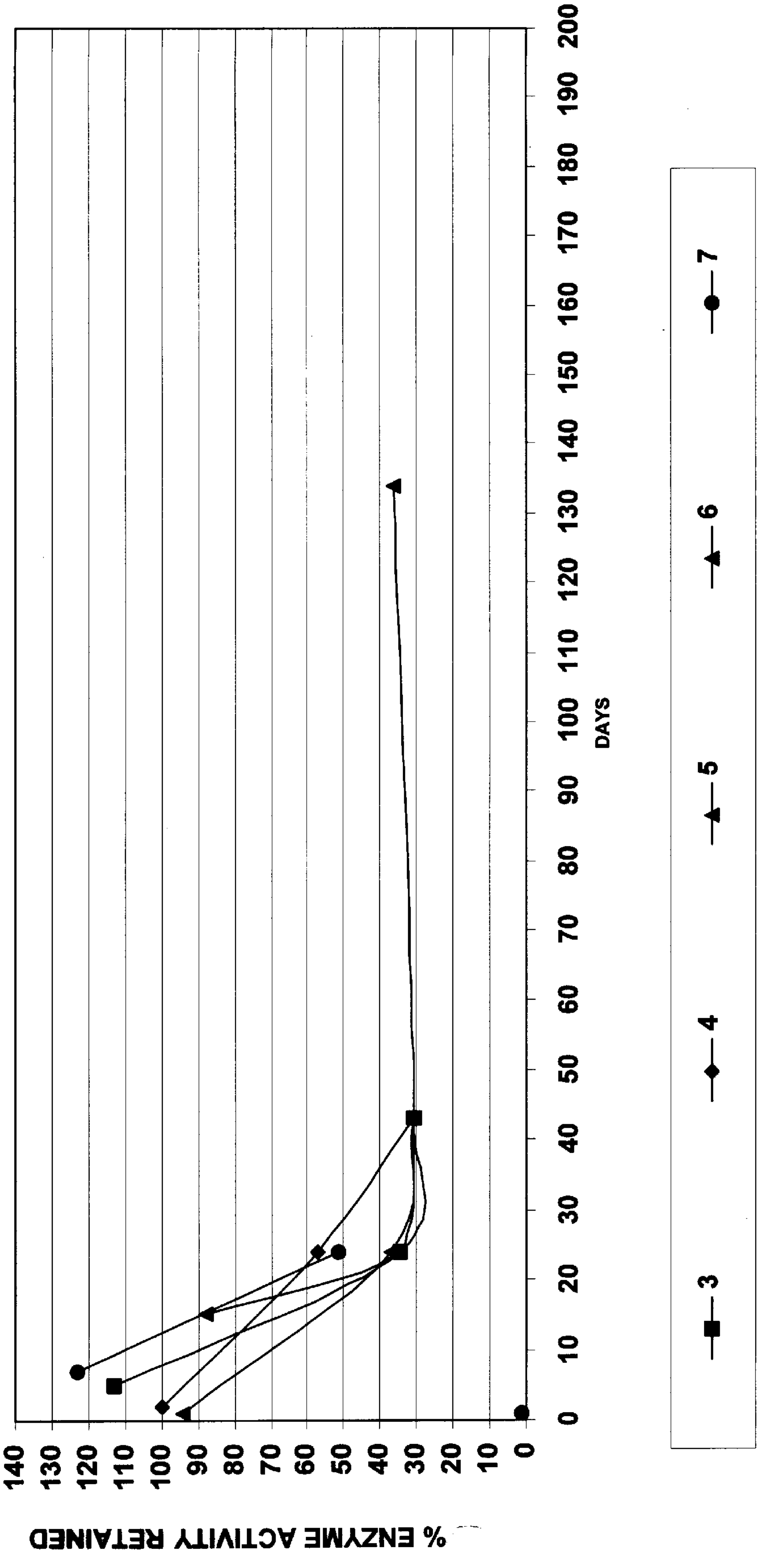
FIG. 3 illustrates the amount of enzyme activity remaining in enzyme cleaning compositions with time at 120° F. for each of formulas 3–7.

Surprisingly, employing the boric acid salt potassium borate dramatically enhanced enzyme storage stability, even though these formulas all contain high levels of water (62.73%–69.13%). This is illustrated in FIGS. 1–3. In fact, the potassium borate compositions exhibit much better enzyme stability than even Formula #3, which has much lower level of water.

FIGS. 1–3 report results obtained with a formula including a protease enzyme. As shown in FIG. 1, protease in formulas of the present invention typically shows levels higher than control levels of protease. That is, the protease that has been in a liquid enzyme cleaning composition

TABLE 1

Conventional and Boric Acid Salt Enzyme Cleaning Compositions

| Ingredient | #1 | #2 | #3 | #4 | #5 | #6 | #7 | #8 |
|---|---|---|---|---|---|---|---|---|
| Soft Water | 62.98 | 58.98 | 33.30 | 48.73 | 47.73 | 50.23 | 52.73 | 52.73 |
| $CaCl_2$ | | | | 0.25 | 0.25 | 0.25 | 0.25 | 0.25 |
| Propylene Glycol | 10.00 | 10.00 | 30.00 | 10.00 | 8.00 | 8.00 | 8.00 | |
| Sorbitol, 70% | | | | | | | | 8.00 |
| Miranol FBS/C2M-SF, 39% | 5.00 | 5.00 | 10.00 | 5.00 | 8.00 | 8.00 | 8.00 | 8.00 |
| MEA | | 15.00 | 15.00 | | | | | |
| KOH, 45% | | | | 20.00 | 20.00 | 17.50 | 15.00 | 15.00 |
| Sodium Carbonate | 15.00 | | | | | | | |
| Boric Acid | | | | 10.00 | 10.00 | 10.00 | 10.00 | 10.00 |
| Briquest 301-50A | | 9.68 | 9.68 | | | | | |
| Citric Acid, Granular | | | | 4.00 | 4.00 | 4.00 | 4.00 | 4.00 |
| Dequest 2010 | 5.00 | | | | | | | |
| Enzyme, Purefect 4000L | 2.00 | 2.00 | 2.00 | 2.00 | 2.00 | 2.00 | 2.00 | 2.00 |
| Acid Green 25 | 0.02 | 0.02 | 0.02 | 0.02 | 0.02 | 0.02 | 0.02 | 0.02 |
| Total | 100.00 | 100.68 | 100.00 | 100.00 | 100.00 | 100.00 | 100.00 | 100.00 |
| 100% pH | 10.2 | 10.75 | 10.38 | 10 | 10 | 9.3 | 9.04 | |
| .2% pH | | 9.82 | 9.47 | 9.34 | 9.27 | 9.13, 9.09 | 9.09 | |
| Grams of $Ca^{2+}$ and $Mg^{2+}$ chelated | 0.5 | 1.04 | 1.04 | 1 | 1.04 | 1.04, 1.00 | 1 | 1 |
| % Water | 68.03 | 66.97 | 44.29 | 62.73 | 63.53 | 64.66 | 65.78 | 69.13 |

Formula #1 provides a representative conventional composition employing ash/ATMP for maintaining an alkaline pH. As can be seen in FIGS. 1–3, these formulas quickly lost their enzyme activity upon storage, even at ambient temperature.

Formulas #2 and #3 provide representative conventional compositions employing MEA/ATMP for alkalinity. FIGS. 1–3, illustrate that, in conventional compositions, reducing water concentration to below 45% (Formula #3) increases enzyme stability compared to a composition having 67% water (Formula #2). The level of enzyme stability at 67% water is unacceptable for a commercial enzyme cleaning composition.

Formulas #4–#8 include the boric acid salt potassium borate, which maintains alkaline pH and stabilizes the according to the invention has greater or enhanced activity compared to the same quantity of enzyme that has not been in the inventive composition. The present compositions not only stabilize the enzyme, but also enhance the activity of certain enzymes, e.g. proteases.

Although not shown in the present Table or Figures, amylase enzymes were also stabilized in the liquid enzyme cleaning composition of the present invention. The amylase retained all of its initial activity upon storage at ambient temperature for at least 35 days. These results indicate that the present compositions stabilize several different enzymes.

Materials

The following materials present examples of materials suitable for preparing the compositions of the present invention. Calcium Chloride: Calcium chloride Pellets 90 (Dow chemical). Propylene Glycol: Propylene Glycol, Technical (Eastman Kodak, Arco Chemical, Arch Chemical, Huntsman Corporation). Sorbitol: Sorbitol solution 70% USP/FCC (Lonza, Sorini, Specialtity Products Corporation, Archer Daniels Midland, Roquette Corporation). Miranol: Dicarboxylic Coconut derivative Sodium Salt, 38% (Lonza, Mcintyre Group LTD, Rhodia). MEA: Monoethanolamine, 99% (Dow Chemical, Huntsman Corporation, EquiStar, Union Carbide). KOH: Potassium Hydroxide, 45% (Ashta, OxyChem, Vulcan Chemical). Sodium Carbonate: Sodium Carbonate, Dense Soda Ash (North American Chemical, Vulcan, Occidental Chemical). Boric Acid: Boric Acid, Orthoboric Acid (U.S. Borax, North American Chemical). Briquest 301-50A: Amino Tri i (Methylene Phosphonic Acid) (ATMP), 50%, low ammonia (Albright & Wilson). Citric Acid: Citric Acid, anhydrous granular (AE Staley Mfg. Co., Huangshi Xianglung Corporation, Zhong Ya Chemical, China Huitung Corporation, Chiel Sugar). Dequest 2010: Phosphonic Acid (1-hydroxyethylidene)bis, 60% (Solutia Inc.). Purefect 4000L: Purafect 4000L, Subtilisin Protease Enzyme (Genencor International). Acid Green 25: Dye, Acid Green 25 (Bayer Corporation, Crompton & Knowles).

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

All publications and patent applications in this specification are indicative of the level of ordinary skill in the art to which this invention pertains.

The invention has been described with reference to various specific and preferred embodiments and techniques. However, it should be understood that many variations and modifications may be made while remaining within the spirit and scope of the invention.

We claim:

1. A liquid enzyme cleaning composition comprising surfactant, detersive enzyme, 10% to about 20% by weight boric acid salt, and 60% to about 85% by weight water;

the boric acid salt remaining dissolved in the cleaning composition at room temperature;

wherein the liquid enzyme cleaning composition is formulated to provide detersive enzyme that retains about 100% of its initial activity at ambient temperature for at least 11 months after forming the composition.

2. The composition of claim 1, wherein the boric acid salt comprises an alkali metal boric acid salt, an alkanol amine boric acid salt, or a combination thereof.

3. The composition of claim 2, wherein the boric acid salt comprises monoethanolammonium borate, diethanolammonium borate, triethanolammonium borate, or a combination thereof.

4. The composition of claim 1, wherein the boric acid salt comprises potassium borate.

5. The composition of claim 4, wherein the potassium borate comprises a combination of potassium hydroxide and boric acid.

6. The composition of claim 4, wherein the composition comprises about 10 to about 15 weight percent potassium borate.

7. The composition of claim 1, wherein the composition is a solution.

8. The composition of claim 1, wherein the composition comprises 60% by weight to about 70% by weight water.

9. The composition of claim 1, wherein the detersive enzyme retains at least 80% of its initial activity at 100° F. for at least 70 days after forming the composition.

10. The composition of claim 1, wherein the detersive enzyme retains at least 40% of its initial activity at 120° F. for at least 25 days after forming th composition.

11. The composition of claim 1, wherein the detersive enzyme comprises protease, amylase, lipase, cellulase, peroxidase, gluconase, or a combination thereof.

12. The composition of claim 11, wherein the detersive enzyme comprises alkaline protease, lipase, amylase, or a combination thereof.

13. The composition of claim 1, wherein the surfactant comprises amphoteric surfactant.

14. The composition of claim 13, wherein the amphoteric surfactant comprises a coconut derived surfactant comprising an ethylenediamine moiety, an amide moiety, an amino acid moiety, or a combination thereof; and an aliphatic moiety.

15. The composition of claim 13, wherein the amphoteric surfactant comprises an alkyl amphodicarboxylic acid.

16. The composition of claim 13, wherein the amphoteric surfactant comprises $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH, or a combination thereof.

17. The composition of claim 13, wherein the amphoteric surfactant comprises disodium cocoampho dipropionate, disodium cocoampho diacetate, or a combination thereof.

18. The composition of claim 1, further comprising source of calcium ions, polyol builder, dye, or a combination thereof.

19. The composition of claim 18, wherein the surfactant comprises an amphoteric surfactant, the detersive enzyme comprises protease, the boric acid salt comprises potassium borate, the source of calcium ions comprises calcium chloride, the polyol comprises propylene glycol, and the builder comprises citric acid salt.

20. The composition of claim 19, comprising about 8% by weight surfactant, about 2% by weight protease, 10% to about 15% by weight potassium borate, about 0.25% by weight calcium chloride, about 8% by weight propylene glycol, and about 4% to about 7% by weight citric acid salt.

21. The composition of claim 1, further comprising a pH in the range of about 9 to about 10.

22. The composition of claim 1, wherein the liquid enzyme cleaning composition is formulated to provide detersive enzyme that has more than 100% of its initial activity after forming the composition.

23. A liquid enzyme cleaning composition comprising surfactant, detersive enzyme, 10% to about 20% by weight potassium borate, and 60% to about 85% by weight water;

the potassium borate remaining dissolved in the cleaning composition at room temperature.

24. The composition of claim 23, wherein the potassium borate comprises a combination of potassium hydroxide and boric acid.

25. The composition of claim 23, wherein the composition comprises about 10 to about 15 weight percent potassium borate.

26. The composition of claim 23, wherein the composition is a solution.

27. The composition of claim 23, wherein the composition comprises 60% by weight to about 70% by weight water.

28. The composition of claim 23, wherein the detersive enzyme retains about 100% of its initial activity at ambient temperature for at least 11 months after forming the composition.

29. The composition of claim 23, wherein the detersive enzyme retains at least 80% of its initial activity at 100° F. for at least 70 days after forming the composition.

30. The composition of claim 23, wherein the detersive enzyme retains at least 40% of its initial activity at 120° F. for at least 25 days after forming the composition.

31. The composition of claim 23, wherein the detersive enzyme comprises protease, amylase, lipase, cellulase, peroxidase, gluconase, or a combination thereof.

32. The composition of claim 31, wherein the detersive enzyme comprises alkaline protease, lipase, amylase, or a combination thereof.

33. The composition of claim 23, wherein the surfactant comprises amphoteric surfactant.

34. The composition of claim 33, wherein the amphoteric surfactant comprises a coconut derived surfactant comprising an ethylenediamine moiety, an amide moiety, an amino acid moiety, or a combination thereof, and an aliphatic moiety.

35. The composition of claim 33 wherein the amphoteric surfactant comprises an alkyl amphodicarboxylic acid.

36. The composition of claim 33, wherein the amphoteric surfactant comprises $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH, or a combination thereof.

37. The composition of claim 33, wherein the amphoteric surfactant comprises disodium cocoampho dipropionate, disodium cocoampho diacetate, or a combination thereof.

38. The composition of claim 23, further comprising source of calcium ions, polyol, builder, dye, or a combination thereof.

39. The composition of claim 38, wherein the surfactant comprises an amphoteric surfactant, the detersive enzyme comprises protease, the boric acid salt comprises potassium borate, the source of calcium ions comprises calcium chloride, the polyol comprises propylene glycol, and the builder comprises citric acid salt.

40. The composition of claim 38, comprising about 8% by weight surfactant, about 2% by weight protease, 10% to about 15% by weight potassium borate, about 0.25% by weight calcium chloride, about 8% by weight propylene glycol, and about 4% to about 7% by weight citric acid salt.

41. The composition of claim 23, further comprising a pH in the range of about 9 to about 10.

42. The composition of claim 23, wherein the liquid enzyme cleaning composition is formulated to provide detersive enzyme that has more than 100% of its initial activity after forming the composition.

43. A liquid enzyme cleaning composition comprising surfactant, a detersive enzyme, 10% to about 20% by weight alkanol amine boric acid salt, and 60% to about 85% by weight water.

44. The composition of claim 43, wherein the boric acid salt comprises monoethanolammonium borate, diethanolammonium borate, triethanolammonium borate, or a combination thereof.

45. A liquid enzyme cleaning composition comprising a surfactant; a detersive enzyme; 60% to about 80% by weight water; and 10% to about 20% by weight potassium borate, monoethanolammonium borate, diethanolammonium borate, triethanolammonium borate, or a combination thereof;

the boric acid salt remaining dissolved in the cleaning composition at room temperature.

46. A liquid enzyme cleaning composition comprising surfactant, detersive enzyme, 10% to about 20% by weight boric acid salt, and greater than 80% by weight water;

the boric acid salt remaining dissolved in the cleaning composition at room temperature.

* * * * *